Aug. 21, 1951  R. C. MACHLER  2,565,249
HIGH-TEMPERATURE MEASURING SYSTEM
Filed Aug. 20, 1945  2 Sheets-Sheet 1
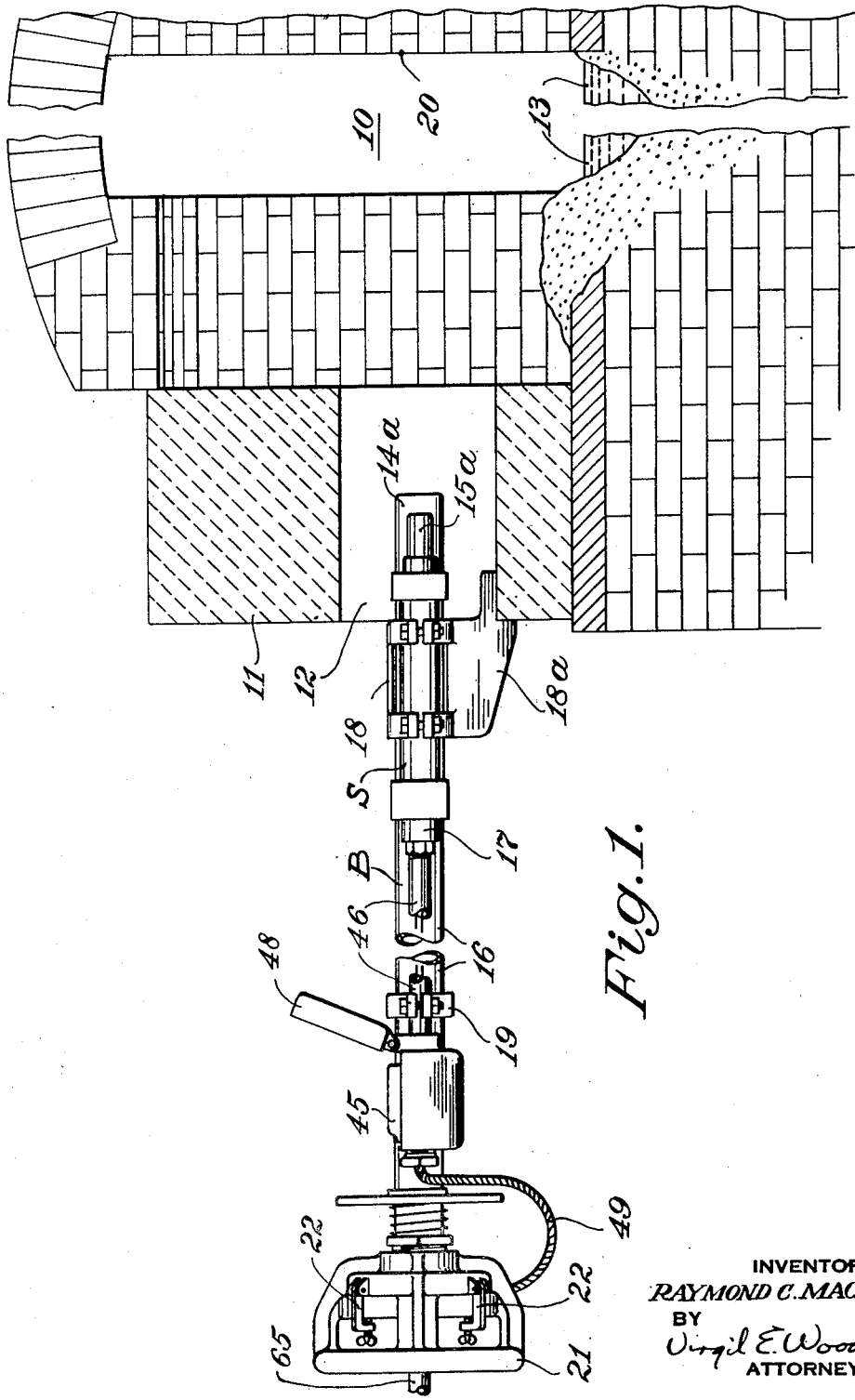
INVENTOR
RAYMOND C. MACHLER
BY
Virgil E. Woodcock
ATTORNEY Aug. 21, 1951 — R. C. MACHLER — 2,565,249
HIGH-TEMPERATURE MEASURING SYSTEM
Filed Aug. 20, 1945 — 2 Sheets-Sheet 2

INVENTOR.
RAYMOND C. MACHLER
BY Virgil E. Woodcock
ATTORNEY

Patented Aug. 21, 1951

2,565,249

UNITED STATES PATENT OFFICE 2,565,249

HIGH-TEMPERATURE-MEASURING SYSTEM

Raymond C. Machler, Philadelphia, Pa., assignor to Leeds and Northrup Company, Philadelphia, Pa., a corporation of Pennsylvania Application August 20, 1945, Serial No. 611,523

2 Claims. (Cl. 73—355)

This invention relates to apparatus for measuring high temperatures, particularly temperatures of molten metal such as produced in open hearth or similar furnaces utilized in refining a charge and has for an object the provision of means for adjusting the output of a radiation pyrometer unit to compensate for changes in optical characteristics thereof incident to use.

The present invention is particularly applicable to temperature-measuring systems of the type disclosed in Collins et al. Patent No. 2,020,019 and to those disclosed in application, Serial No. 611,515, now Patent 2,493,078, filed concurrently herewith by Harold G. Mead, a co-worker, and entitled "High Temperature Measuring System."

Systems of the type disclosed in said patent and in said application include a radiation pyrometer unit carried by a tube, one end of which is immersed in the metal bath of an open hearth furnace for direct measurement of the temperature thereof. Air under pressure is forced through the tube to produce a cavity within the molten metal. Because of the cavity, "black body" conditions are closely approximated. Radiation from the cavity under such conditions is transmitted through an optical system disposed within the tube and is directed thereby to a radiation receiver. Though the lens system may be protected by a cover glass, smoke, dirt, and even particles of molten metal may be deposited on the cover glass and reduce the amount of radiation transmitted therethrough for any given temperature. The time factor in cleaning or replacing the cover glass is of importance. Even if it were replaced it would be necessary to check the output of the device as a whole in order to insure the requisite accuracy in subsequent measurements of temperature. Furthermore, permanent changes in relative location of the pyrometer elements due to relief of strains by the temperatures to which it is exposed may cause permanent changes in the temperature-electromotive force relationship of the pyrometer unit.

In the operation of open hearth furnaces the temperature of the metal bath is of great importance. It is known that metallurgical reactions during the refining period take place better at a particular temperature. It is also important to obtain the proper temperatures of the bath before tapping so as to avoid the formation of "skulls" if the metal is too cold, or rapid deterioration of the ladle linings and production of "stickers" if the metal is too hot. A "skull" is the residue which remains in the ladle by virtue of "freezing" of the metal therein. The weight of a skull may be as much as 3500 pounds. A "sticker" is an ingot which has adhered to the ingot mold as a result of excessive temperature of the metal at the time of pouring. For example, in typical operations, with a bath temperature of 3000° F. no skulls and no stickers were produced. For bath temperatures ranging between 3015° F. and 3055° F. there occurred an average of twelve stickers per heat. On the other hand, with temperatures ranging from 2885° F. to 2960° F., skulls were produced with an average weight of 2000 pounds per heat.

In carrying out the present invention in one form thereof, there has has been provided a means for maintaining the requisite high accuracy of the radiation pyrometer notwithstanding the deposition of foreign material on the cover glass or permanent changes in the relative location of the pyrometer elements. There has been avoided the need to change the cover glass until it becomes badly coated or covered with foreign material. A great saving of time is thereby attained without loss of accuracy in the measurement of the temperature of the metal bath. In accordance with the invention, there is provided a second radiation pyrometer unit optically identical with that used for the measurement of the temperature of the metal bath. With both pyrometer units directed to the same heat source of suitable magnitude, their respective outputs may be compared and the bath-measuring pyrometer unit adjusted until its output is equal to that of the second or standard pyrometer unit even though the heat source be variable and of unknown radiation characteristics. Suitable impedance means may be provided for adjusting the output of the bath-measuring pyrometer unit to provide compensation over a relatively wide range of radiation changes due to fouling of the cover glass.

For a more complete understanding of the invention, and for further objects and advantages thereof, reference should should be had to the following description taken in conjunction with the accompanying drawings, in which:

Fig. 1 is a vertical cross-section through a fractional part of an open hearth furnace showing the invention applied thereto for calibration of the bath-measuring pyrometer unit.

Figure 3:
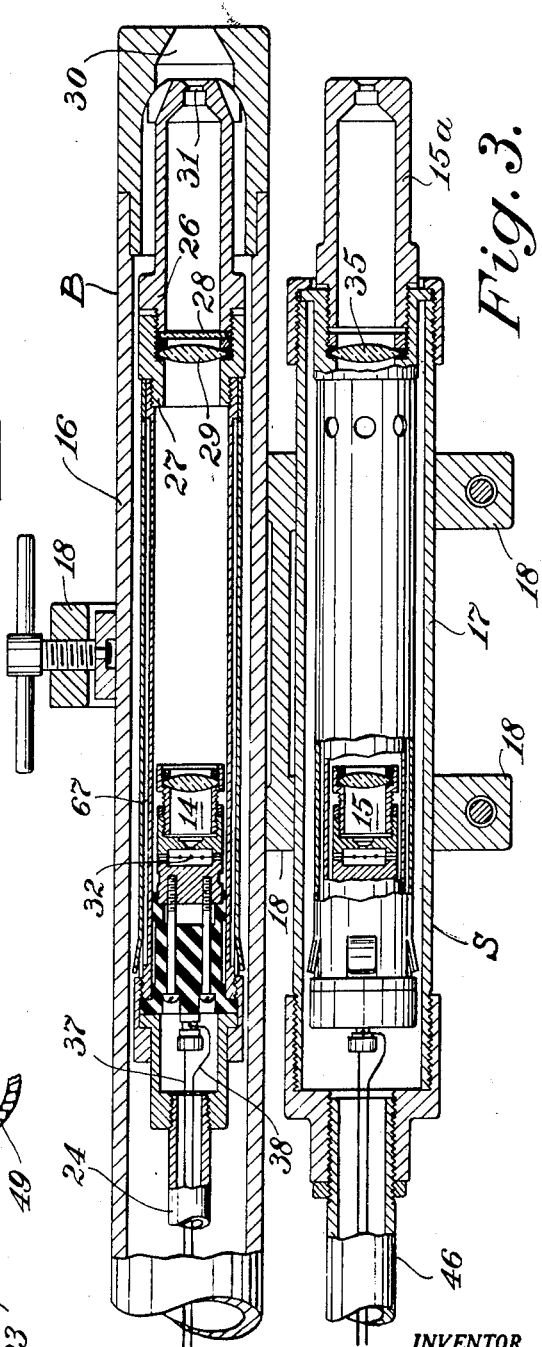
Fig. 3 is a fractional sectional plan view of the pyrometer units of Fig. 1.

Referring to the drawings, the invention in one form has been shown as applied to an open hearth furnace 10 having a door 11 with the usual wicket hole 12 provided for inspection of the metal bath 13. As shown, a bath-measuring pyrometer unit B comprises an electro-optical assembly 14, Fig. 3, disposed within a tubular member or housing 16, while a second optically identical radiation pyrometer assembly 15, Fig. 3, is disposed within a tubular member or housing 17 of a standardizing pyrometer unit S. The two tubular members 16 and 17 are clamped in fixed relationship one to the other by a main clamping means 18, having an extension 18a for supporting the pyrometer in the wicket hole 12, and by a second clamp 19. The clamps 18 and 19 are so designed that the two tubular members 16 and 17 and the pyrometer assemblies 14 and 15 disposed therein are directed to a common region of the rear wall 20 of the open hearth furnace. The result of this arrangement, as clearly shown in Fig. 4, is that the pyrometer units B and S concurrently view a common target area 20A.

The tubular member 16 is supported by means of a wheel or circular handle 21, Fig. 1, provided with a number of clamps 22, two of which are shown. These clamps bear against a circular plate 23, Fig. 2, to which there is secured a tube or pipe 24 leading to the inner housing of the pyrometer assembly 14. By releasing the clamps 22, the circular member 23, the pipe 24 and the pyrometer assembly 14, as a unit, may be withdrawn, to the left, as viewed in Figs. 1 and 3, from the housing or tube 16. When so removed, an end piece 26 may be removed by unscrewing it from a cooperating member 27. In this manner a window 28 may be removed for cleaning or replacement. The window 28 protects the lens 29 against fouling by reason of the entry through the open ends 30 and 31 of the tubular members 16 and 26 of smoke, dirt, and, in some cases, particles of molten metal. During continued use of the immersion unit B, the cover glass 28 will be progressively covered with or fouled by such foreign matter. In consequence, the output from the thermo-electric device or radiation receiver 32 will decrease even though the temperature remains constant. In order to avoid the need frequently to disassemble the bath-measuring pyrometer unit B to restore it to its original condition, the assembly including the pyrometer component or assembly 15 is optically identical with the assembly including pyrometer component or assembly 14. The radiation pyrometer unit S is used for adjustment of the bath-measuring pyrometer B and the former is never used under conditions where fouling is likely to occur. Since unit S is not immersed in the metal bath 13, a cover glass is not provided and its end piece 15a may be unscrewed for ready access to a lens 35, which is dusted or cleaned from time to time.

Figure 4:
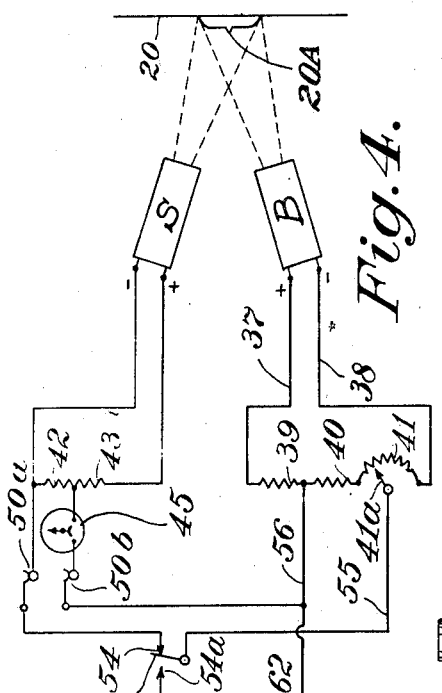
Fig. 4 schematically illustrates the pyrometer units directed towards a common hot zone or target area together with their associated electrical systems.

Referring now to Fig. 4, it will be observed that the pyrometer device of immersion unit B is provided with lead wires 37 and 38 which connect it to an output-adjusting means which includes resistors 39, 40, and 41. In accordance with the invention, the tap or contact 41a on the resistor 41 will be set to a position materially to reduce the output for conditions with the cover glass 28 clean. Thus, as the cover glass 28 becomes fouled and decreases the radiation received by the radiation receiver 32 for a given temperature, the contact or tap 41a may be moved to restore the output to the value it had before the cover glass became fouled.

The adjustment of resistor 41 is accomplished by balancing the electrical outputs of the bath-measuring pyrometer unit B and the standard pyrometer unit S in a standardizing network. This is accomplished by adjusting the output of the pyrometer device 14 of unit B until it is equal to the output of the pyrometer device 15 of unit S when both are receiving radiation from the same heat source. Resistors 42 and 43 are connected across the lead wires from the pyrometer device 15 and a galvanometer 45 is provided to indicate balance of the outputs derived from the pyrometer units B and S. As shown in Fig. 1, the galvanometer 45 is supported by a pipe 46 extending from the tubular member 17. It has a cover 48 to protect it during periods of non-use. A connecting cable 49 extends from the end of the tube 46 and terminates in a plug connection 50 provided with contacts 50a, 50b (Fig. 4) on the face of the circular member 23, Fig. 2 thereby providing detachable electrical connections to standard pyrometer unit S.

Figure 2:
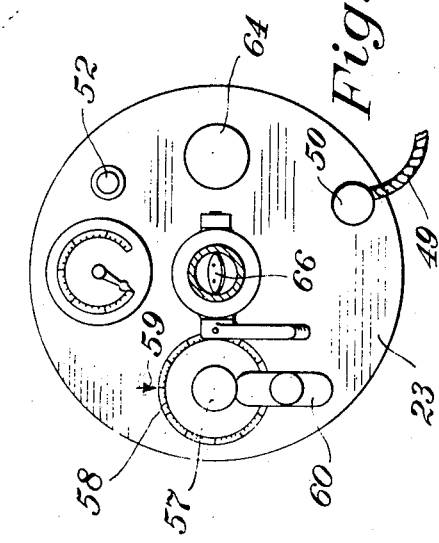
Fig. 2 is an end view, partly in section, of the manually supported end of the bath-measuring pyrometer unit with the handle or supporting ring omitted.

With the plug connection completed, and a button 52 pressed, Fig. 2, to operate a switch arm 53, Fig. 4, into engagement with a contact 54, a circuit is completed through the galvanometer 45 between the respective outputs of the pyrometer devices 14 and 15. If the potential difference derived by conductors 55 and 56 is less than the potential difference across the resistor 42, the galvanometer 45 will deflect in one direction. The adjustable contact 41a will then be moved until the galvanometer 45 is restored to its neutral position. Upon release of the button 52 the switch arm 53 completes a circuit through the other contact 54a. These simple operations are all that are required to restore the immersion unit B for accurate measurement of the temperature of the metal bath 13, Fig. 1.

As shown in Fig. 2, the resistor 41 may be adjusted by means of an operating knob 57 having a scale 58 cooperating with a fixed index 59. Normally, by means of a clamp 60 the dial on which the scale 58 appears is held in a fixed position. During adjustment of the output of the pyrometer device 14 the clamp 60 is released and the knob 57 turned until the galvanometer 45 has been returned to its neutral position.

It will be observed that a switch 62 in its closed position, short-circuits a measuring and recording system 63. The switch 62 is opened by means of a push-button 64 carried on the front of the circular member 23, Fig. 2. The switch 62 is normally biased to its closed position to prevent response of the measuring system 63 until after immersion of the end of the tubular member 16 in the metal bath.

The structural features of the bath-measuring pyrometer unit B and the manner in which it is used to measure temperatures of the bath are fully disclosed and claimed in said co-pending application Serial No. 611,515, now Patent 2,493,078.

After adjustment of the output of the immersion unit B, the clamps 18 and 19 are released for removal from them of that unit. Thereafter, air is admitted to the tubular member 16 of unit B by way of an air connection 65, Fig. 1. It passes through a butterfly valve 66 and thence into the tubular member 16. The air not only flows around the outside of the inner assembly including the radiation receiver 32 but an additional annular path 67 for flow of air is provided further to minimize transfer of unwanted heat to the radiation receiver 32. The air flows through the opening 30 at the immersed end of tube 16 and forms a cavity in the molten metal, as has already been described.

It will now be seen that there has been provided a system by means of which the measuring unit B may be readily adjusted or recalibrated in the field so as to afford a high accuracy of temperature measurement. Though the pyrometer units B and S may, during calibration, be directed to an unknown, indeterminate and fluctuating temperature such as that which exists within an open hearth furnace, nevertheless, the calibration effected by adjustment of the output of the immersion unit B to equality with that of the standard unit S affords accurate measurement by unit B of the temperature of the molten baths in whch it is subsequently immersed. There has been avoided the need to provide sources of known and constant temperature produced under "black body" conditions, requirements which would be indeed difficult to provide in the field, and which, if provided, would require a relatively expensive temperature control system and skilled personnel. In contrast, by providing the standard pyrometer unit S of known calibration which responds to radiation in manner like the immersion unit B, high accuracy may be insured, notwithstanding various degrees of fouling of the cover glass 28 of unit B and absence of steady "black body" conditions during calibration. Accordingly, the pyrometer unit B may be used over relatively long periods of time without disassembly thereof and until the compensation provided for by the variable resistor 41 has been exhausted.

While a preferred embodiment of the invention has been described and illustrated, it is to be understood that modifications may be made within the spirit and scope of the appended claims.

What is claimed is:

1. In combination, an immersion pyrometer unit comprising a sighting tube having an open end for immersion below the surface of molten metal for measurement of the temperature thereof under "black body" conditions, an optical system in said sighting tube including an element exposed through said open end to deposition of foreign material, a thermoelectric device within said sighting tube for producing a voltage dependent upon the impressed radiation passed by said optical system, and calibrating resistance means manually adjustable to vary the ratio of the output voltage of said unit to said voltage produced by said thermoelectric device; a second radiation pyrometer unit comprising a sighting tube and a thermoelectric device therein for producing a voltage dependent upon the radiation impressed thereon; an electrical indicating instrument included in circuit with one of said units, means detachably holding said units in side-by-side position for which said sighting tubes thereof view a common target area without immersion of either of them, and detachable electrical connections between said units while so held temporarily to complete a standardizing network balanceable by adjustment of said calibrating resistance for null indication of said instrument so as to effect recalibration of said immersion pyrometer unit without need to disturb the optical system thereof for removal of said foreign material.

2. In combination, an immersion pyrometer unit comprising a sighting tube having an open end for immersion below the surface of molten metal for measurement of the temperature thereof under "black body" conditions, an optical system in said tube including an element exposed through said open end to deposition of foreign material, a thermoelectric device within said sighting tube for producing a voltage dependent upon the impressed radiation passed by said optical system, switching means operable to one position for applying the output voltage of the unit to a recorder, and calibrating resistance means manually adjustable to vary the ratio of the output voltage of said unit to said voltage produced by said thermoelectric device thereof; a second radiation pyrometer unit comprising a sighting tube, a thermoelectric device therein for producing a voltage dependent upon the radiation impressed thereon, an electrical indicating instrument in circuit with one of said units, means detachably holding said units in side-by-side position for which said sighting tubes thereof view a common target area without immersion of either unit, and detachable electrical connections between said units while so held temporarily to complete for another position of said switching means a standardizing network balanceable by adjustment of said calibrating resistance for null indication of said instrument so as to effect recalibration of said immersion pyrometer unit without need for removal of said foreign material.

RAYMOND C. MACHLER.

REFERENCES CITED

The following references are of record in the file of this patent:

UNITED STATES PATENTS

| Number | Name | Date |
| --- | --- | --- |
| 2,151,928 | Mead | Mar. 28, 1939 |
| 2,184,169 | Sordahl | Dec. 19, 1939 |
| 2,199,082 | Peters | Apr. 30, 1940 |

FOREIGN PATENTS

| Number | Country | Date |
| --- | --- | --- |
| 113,865 | Great Britain | Mar. 14, 1918 |

OTHER REFERENCES

Page 290 of The Measurement of High Temperature by G. K. Burgess and H. Le Chatelier, published by John Wiley & Sons, New York, in 1912. (A copy of this publication may be found in Division 36, U. S. Patent Office.)